US010417890B2

(12) United States Patent
Schomacker

(10) Patent No.: US 10,417,890 B2
(45) Date of Patent: Sep. 17, 2019

(54) TAMPER DETECTION DEVICE

(71) Applicant: NXP B.V., Eindhoven (NL)

(72) Inventor: Ronny Schomacker, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/605,921

(22) Filed: May 25, 2017

(65) Prior Publication Data

US 2017/0345269 A1    Nov. 30, 2017

(30) Foreign Application Priority Data

May 26, 2016    (EP) .................................... 16171470

(51) Int. Cl.
*G08B 13/24*    (2006.01)
*G06K 7/10*    (2006.01)
*G09F 3/03*    (2006.01)

(52) U.S. Cl.
CPC ..... *G08B 13/2434* (2013.01); *G06K 7/10237* (2013.01); *G08B 13/2431* (2013.01); *G09F 3/0335* (2013.01); *G09F 3/0376* (2013.01)

(58) Field of Classification Search
CPC ....... G08B 13/2431; G09F 3/03; G09F 3/035; G09F 3/0335
See application file for complete search history.

(56) References Cited

U.S. PATENT DOCUMENTS

| 6,262,664 | B1 * | 7/2001 | Maloney | ............... | A45C 13/18 |
| | | | | | 340/568.2 |
| 7,479,887 | B2 | 1/2009 | Meyer | | |
| 8,040,244 | B2 | 10/2011 | Bauchot et al. | | |
| 2004/0227632 | A1 * | 11/2004 | Grijalva | ........... | G06K 19/07798 |
| | | | | | 340/550 |
| 2007/0052539 | A1 | 3/2007 | Brown | | |
| 2013/0135104 | A1 | 5/2013 | Nikkanen | | |
| 2015/0077257 | A1 | 3/2015 | Pokrajac et al. | | |

OTHER PUBLICATIONS

Extended European Search Report for Patent Appln. No. 16171470.4 (dated Nov. 23, 2016).
"((rfid))-TamperProof label: absolutely unique". Schreiner LogiData, 1 pg., retreived from internet archive at: https://web.archive.org/web/20150920051100/http://www.schreiner-logidata.com/3/rfid-labels-and-rfid-tags/rfid-tamperproof/ (Sep. 2015).
"Tamper-Proof Label (NFC)", Core RFID Ltd, 1 pg., retreived from Internet Archive at: https://web.archive.org/web/20150503150759/http://www.rfidshop.com/tamper-proof-label-nfc-578-p.asp (May 2015).
Kuphaldt, T. R. "Lessons in Electric Circuit, vol. I—Direct Current (DC)—Chapter 9: Electrical Instrumentation Signals—Strain Gauges", 11 pgs, retrieved from the internet at: https://www.allaboutcircuits.com/textbook/direct-current/chpt-9/strain-gauges/ (2006).
"Semiconductor-SG—SS-060-033-500P-S4-Pack4", ME-Meßsysteme GmbH, 1 pg., retrieved from internet archive at: http://web.archive.org/web/20160422144843/http://www.me-systeme.de/shop/en/dehnungsmessstreifen/halbleiter-dms?cat=333 (2016).

* cited by examiner

*Primary Examiner* — Hongmin Fan

(57) ABSTRACT

According to a first aspect of the present disclosure, an electronic tamper detection device is provided, comprising a tamper loop and a deformable component, wherein a deformation of said component indicates that the tamper loop has been broken. According to a second aspect of the present disclosure, a corresponding method of producing a tamper detection device is conceived.

16 Claims, 3 Drawing Sheets

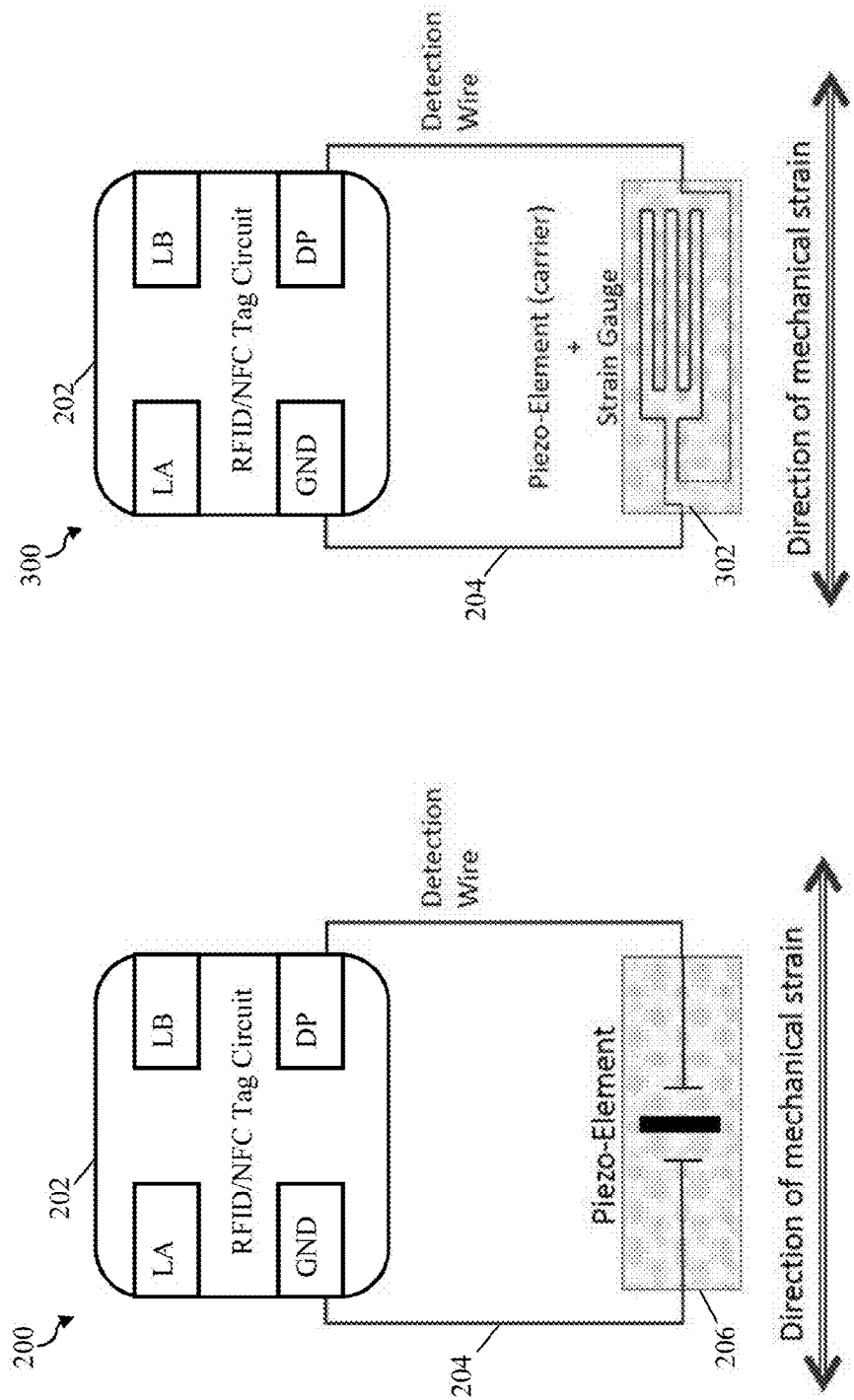

TAMPER DETECTION DEVICE

CROSS-REFERENCE TO RELATED APPLICATIONS

This application claims the priority under 35 U.S.C. § 119 of European patent application no. 16171470.4, filed on May 26, 2016, the contents of which are incorporated by reference herein.

FIELD

The present disclosure relates to an electronic tamper detection device. Furthermore, the present disclosure relates to a corresponding method of producing an electronic tamper detection device.

BACKGROUND

Electronic tamper detection devices may be used to detect tampering with closed or sealed products, such as bottles, packets and other containers. For example, in the spirits industry and the pharmaceutical industry such tamper detection devices may be useful. Tamper detection devices often contain a so-called tamper loop. A tamper loop may for example comprise a conductive wire that is broken when a closure or seal in which it is concealed is broken. Frequently used tamper detection devices are radio frequency identification (RFID) or near field communication (NFC) tags comprising or extended with a tamper loop. It may be desirable to improve these tamper detection devices, so that more tamper attempts can be detected.

SUMMARY

According to a first aspect of the present disclosure, an electronic tamper detection device is provided, comprising a tamper loop and a deformable component, wherein a deformation of said component indicates that the tamper loop has been broken.

In one or more embodiments of the tamper detection device, the component is a piezoelectric or piezoceramic device.

In one or more embodiments of the tamper detection device, the component forms an integral part of the tamper loop.

In one or more embodiments of the tamper detection device, the tamper loop comprises a conductive wire.

In one or more embodiments, the tamper detection device is configured to detect the deformation of the component by sensing a change in ohmic resistance resulting from said deformation.

In one or more embodiments, the tamper detection device further comprises a sensing circuit configured to sense said change in ohmic resistance.

In one or more embodiments of the tamper detection device, the sensing circuit is a strain gauge.

In one or more embodiments, the tamper detection device is a passive RFID or NFC tag.

In one or more embodiments, the tamper detection device is embedded in a closure or a seal.

According to a second aspect of the present disclosure, a method of producing an electronic tamper detection device is conceived, wherein the tamper detection device is provided with a tamper loop and a deformable component, wherein a deformation of said component indicates that the tamper loop has been broken.

In one or more embodiments of the method, the component is a piezoelectric or piezoceramic device.

In one or more embodiments of the method, the component forms an integral part of the tamper loop.

In one or more embodiments of the method, the tamper loop comprises a conductive wire.

In one or more embodiments of the method, the tamper detection device is further provided with a sensing circuit configured to sense a change in ohmic resistance resulting from the deformation of the component.

In one or more embodiments of the method, the sensing circuit is a strain gauge.

DESCRIPTION OF DRAWINGS

Embodiments will be described in more detail with reference to the appended drawings, in which:

FIG. 2 shows an illustrative embodiment of a tamper detection device;

FIG. 3 shows another illustrative embodiment of a tamper detection device;

DESCRIPTION OF EMBODIMENTS

Figure 1:
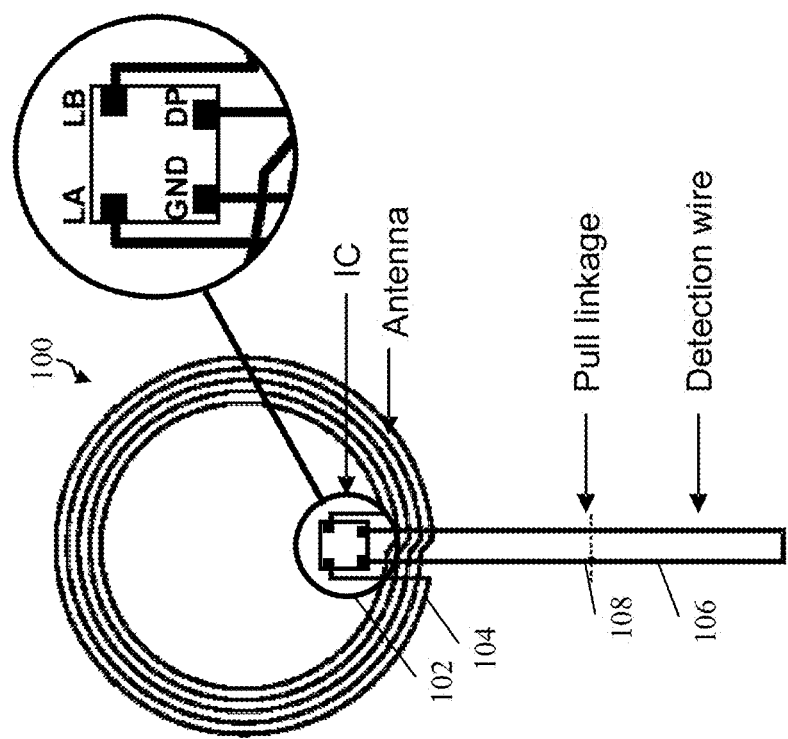
FIG. 1 shows an example of a tamper detection device.

FIG. 1 shows an example of an electronic tamper detection device 100. In this example, the tamper detection device 100 is an RFID or NFC tag equipped with a tamper loop. The tag may be a so-called passive tag, i.e. a tag powered by an electromagnetic field generated by an external device (not shown). The tag comprises an integrated circuit 102 (i.e., a tag circuit) which is coupled through contact pads LA and LB to an antenna 104 for establishing wireless communication with said external device. The tamper loop is formed by a detection wire 106 (i.e., a conductive wire) which is coupled to the integrated circuit 102 through contact pads GND and DP. The detection wire 106 may for example be concealed in a closure comprising a pull linkage 108. In operation, once the detection wire 106 (tamper loop) has been broken (e.g., at the pull linkage 108) and the tag is powered by said electromagnetic field, the tag can detect the "Open" information and act accordingly. As used herein, "Open" information refers to information indicative of an opened or broken tamper loop, while "Close" information refers to information indicative of a closed or unbroken tamper loop.

Electric energy may be required for reading the state of the tamper loop. For example, in case the tamper loop comprises a conductive wire 106, its state is normally read by generating a current that will flow (in case the wire is unbroken) or not flow (in case the wire is broken) from one contact pad to another. However, under some circumstances electric energy may not be available. For example, a passive RFID or NFC tag 100 has no internal power source and the tag's circuit 102 can only be powered by an electromagnetic field generated by an external device, which may or may not be in the tag's proximity. That is to say, a passive tag is typically unpowered for large periods of time. Then, if somebody breaks the tamper loop and repairs it while the tag circuit 102 is unpowered, the circuit 102 will not be able to detect that the tamper loop has been opened in the meantime. Consequently, some tamper attempts may remain undetected. Thus, it is desirable to improve the tamper detection device 100, so that more tamper attempts can be detected.

Therefore, in accordance with the present disclosure, an electronic tamper detection device is provided, comprising a tamper loop and a deformable component, wherein a deformation of said component indicates that the tamper loop has been broken. In particular, the deformation of said component represents the "Open" information. In this way, it is probable that the "Open" information is retained because the deformation of said component typically lasts longer than an unpowered state of a tag. Thus, tamper attempts occurring when a tag is unpowered, for example, may still be detected.

In one or more embodiments, the component is a piezoelectric or piezoceramic device. A piezoelectric or piezoceramic device is particularly suitable as a deformable component of the kind set forth. A piezoelectric device may be made, for example, of a simple crystalline material. A piezoceramic device may be made of a composite material, such as barium titanate (BaTiO$_3$) or lead zirconate titanate (PZT). Usually these devices behave elastically (elastic deformation), but they also have a region where they behave plastically. This plastic deformation is caused by mechanical overstress. The plastic deformation of a piezoelectric or piezoceramic device is in practice a quasi-permanent deformation, because it is virtually impossible to undo it. From this perspective, the piezoelectric or piezoceramic device may be regarded as similar to a one-bit memory cell (i.e., a one-time programmable memory cell). The original state of the piezoelectric or piezoceramic device represents the "Close" information, and the deformed state represents the "Open" information. If somebody opens for instance a wine-bottle, he will cause an overstress on the piezoelectric or piezoceramic device by turning the closure; this yields the "Open" information by cutting off the tamper loop and by plastic deformation. The next time the RFID/NFC tag circuit is powered up, it detects that the tamper loop has been opened. Even if the tamper loop has been repaired, the tag circuit will read the "Open" information because the piezoelectric or piezoceramic device is quasi-permanently deformed. Due to the high forces necessary to plastically deform a piezoelectric or piezoceramic material, it is virtually impossible to bring it back to its original state.

In one or more embodiments, the deformable component forms an integral part of the tamper loop. In this way, since the tamper loop is normally placed at a location where a tamper attempt may be expected, it is more likely that the component becomes subject to mechanical overstress in case of a tamper attempt. In a practical and efficient implementation, the component may be integrated with a conductive wire to form a single tamper loop.

FIG. 2 shows an illustrative embodiment of a tamper detection device 200. The tamper detection device 200 comprises an RFID or NFC tag circuit 202 coupled to a detection wire 204 through contact pads GND and DP. In particular, a voltage may be supplied to the detection wire 204 through contact pad DP (detection pad). Contact pad GND is a ground pad; alternatively another detection pad (not shown) may be used in case the measurement is not ground-based. Furthermore, the tag circuit 202 comprises contact pads LA and LB, for coupling the tag circuit 202 to an antenna (not shown) that may extract power from an electromagnetic field. Furthermore, the tag detection device 200 comprises a deformable component embodied as a piezo-element 206. As used herein, the term "piezo-element" refers to a piezoelectric device or a piezoceramic device. In operation, the piezo-element 206 may transition from an initial state to a state of quasi-permanent deformation in response to mechanical strain or overstress caused by a tamper attempt.

FIG. 3 shows another illustrative embodiment of a tamper detection device 300. In this example, the piezo-element 302 is integrated with a sensing circuit, more specifically a strain gauge for measuring a change in ohmic resistance caused by the plastic deformation of the piezo-element 206.

Figure 4:
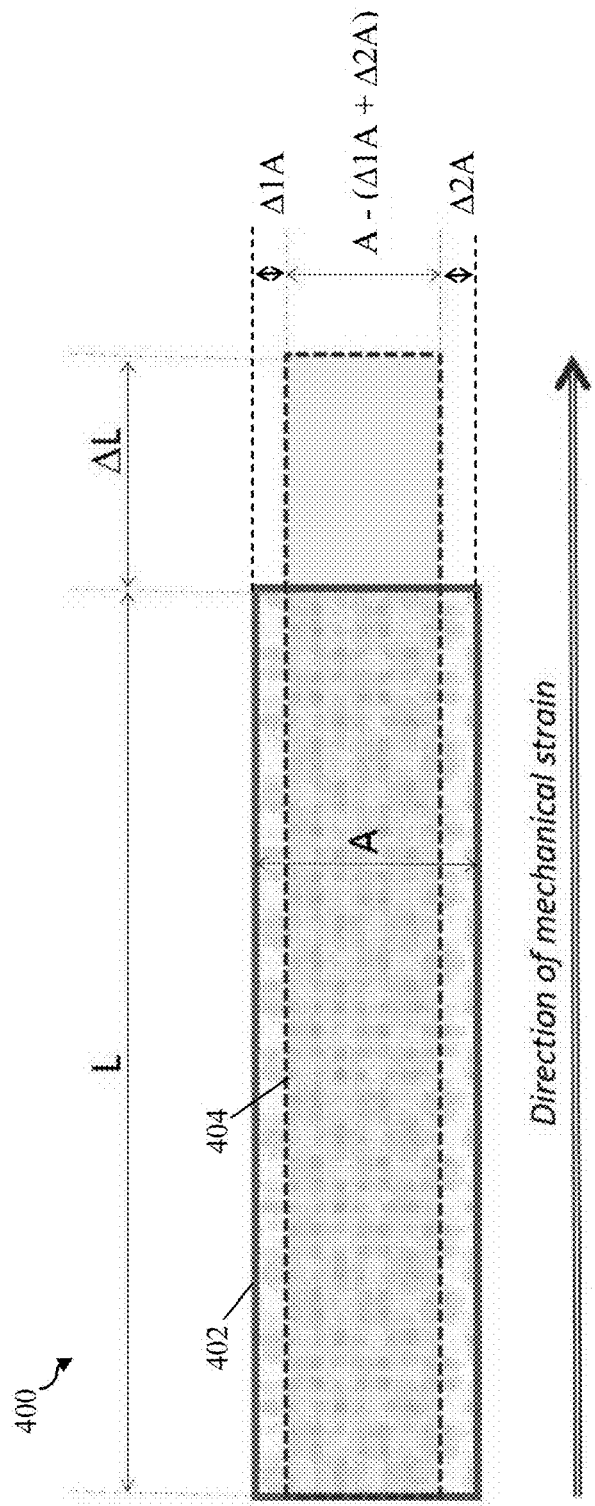
FIG. 4 shows an illustrative embodiment of a piezo-element.

FIG. 4 shows an illustrative embodiment of a piezo-element 400. A practical and efficient way to detect a deformation, i.e. a constitutional change, of a piezoelectric or piezoceramic device is to measure the change of ohmic resistance caused by said change. FIG. 4 shows how the ohmic resistance changes in dependence on a constitutional change of a piezo-element 400. In its original state 402, the ohmic resistance of the piezo-element 400 may be defined by:

$$R = \rho \frac{L}{A}$$

Herein, variable R represents the ohmic resistance, constant $\rho$ represents the electric resistivity of the material of which the piezo-element 400 is made, variable L represents the length of the piezo-element 400 and variable A represents the thickness of the piezo-element 400. In its deformed state 404, the ohmic resistance of the piezo-element 400 may now be defined by:

$$\Delta R = \rho \left( \frac{L + \Delta L}{A - (\Delta 1A + \Delta 2A)} - \frac{L}{A} \right)$$

The resulting change of voltage may be defined by:

$$\Delta V = \Delta R \cdot I$$

Herein, variable I represents the current driven through the piezo-element 400. When the piezo-element is in its original state a calibration measurement may be done. This calibration measurement may be done by driving a current through the piezo-element, and taking the resulting measured voltage as a base value. In use, when performing a measurement after a plastic deformation of the piezo-element has taken place, another voltage level will be measured. Then, if the difference between the measured voltage level and the base value exceeds a predefined threshold, it may be concluded that the plastic deformation has taken place. The change of ohmic resistance caused by the constitutional change of the piezo-element may either be measured directly (as shown in FIG. 2) or using a sensing circuit, e.g. a strain gauge (as shown in FIG. 3). In case of a direct measurement, the piezo-element is conductive, so a voltage drop over the piezo-element can be measured directly after injecting a current from the detection pad DP to GND. In case of an indirect measurement, the carrier does not need to be conductive, and the measurement is done with a sensing circuit. The current may be supplied by the tag circuit 202 and may flow from one of the tamper contact pads through the detection wire 204 and the piezo-element 206, 302, to the other of the tamper contact pads. Then, the voltage drop over the piezo-element 206, 302 may be evaluated and compared with an internal reference value (base value) indicating whether the piezo-element 206, 302, is in the deformed state. The material of the detection wire 204 may be chosen such that it breaks only when the piezo-element 206, 302 has already been deformed plastically, so as to increase the reliability of the tamper detection device 200, 300.

It is noted that the embodiments above have been described with reference to different subject-matters. In particular, some embodiments may have been described with reference to method-type claims whereas other embodiments may have been described with reference to device-type claims. However, a person skilled in the art will gather from the above that, unless otherwise indicated, in addition to any combination of features belonging to one type of subject-matter also any combination of features relating to different subject-matters, in particular a combination of features of the method-type claims and features of the device-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 tamper detection device
102 integrated circuit
104 antenna
106 detection wire
108 pull linkage
200 tamper detection device
202 RFID/NFC tag circuit
204 detection wire
206 piezo-element
300 tamper detection device
302 piezo-element (carrier) and strain gauge
400 piezo-element
402 original state
404 deformed state

The invention claimed is:

1. An electronic tamper detection device comprising:
a tamper loop, including an electrical conductor, and a deformable component arranged as part of the tamper loop, wherein the deformable component is a piezoelectric or piezoceramic device including an electrical conductor, wherein a plastic deformation of the component indicates that the tamper loop has been broken, wherein the plastic deformation causes the component to become quasi-permanently deformed; and
an integrated circuit (IC) configured and arranged with the tamper loop to detect changes in current indicative of tampering in response to the tamper loop being broken, wherein the IC is further configured and arranged to detect tampering when the tamper loop is subsequently repaired in response to the plastic deformation, and wherein the component is configured and arranged to plastically deform in response to the tampering, the plastic deformation causing the component to transition from an initial deformed state to a quasi-permanently deformed state.

2. The tamper detection device of claim 1, wherein the electrical conductor comprises a conductive wire coupled to the IC, wherein the tamper loop is further configured and arranged to break in response to the quasi-permanent deformation of the deformable component.

3. The tamper detection device of claim 1, being configured to detect the deformation of the component by sensing a change in ohmic resistance resulting from said deformation.

4. The tamper detection device of claim 3, further comprising a sensing circuit configured to sense said change in ohmic resistance.

5. The tamper detection device of claim 4, wherein the sensing circuit is a strain gauge.

6. The tamper detection device of claim 1, being a passive NFC or RFID tag, wherein the device further includes an antenna coupled to the IC.

7. The tamper detection device of claim 1, being embedded in a closure or a seal.

8. The tamper detection device of claim 1, wherein the piezoelectric or piezoceramic device includes a crystalline, barium titanate, or lead zirconate titanate material.

9. The tamper detection device of claim 1, wherein the tamper loop being configured and arranged to break in response to the quasi-permanent deformation of the deformable component, and the IC is further configured and arranged to detect tampering when the tamper loop is subsequently repaired in response to the plastic deformation.

10. The tamper detection device of claim 1, wherein the component is configured and arranged to transition from an initial state to a state of quasi-permanent deformation responsive to the plastic deformation of the component which indicates that the tamper loop is broken.

11. The tamper detection device of claim 10, wherein the IC is further configured to detect a change in ohmic resistance resulting from the state of quasi-permanent deformation of the component, and in response to the detected change, detect tampering when the tamper loop is subsequently repaired.

12. The tamper detection device of claim 10, wherein the component further includes a sensing circuit configured and arranged with the IC to sense a change in ohmic resistance resulting from the state of quasi-permanent deformation of the component, and in response to the detected change, detect tampering when the tamper loop is subsequently repaired.

13. A method of producing an electronic tamper detection device, comprising:
- providing a tamper loop including a conductive wire and a deformable component arranged as part of the tamper loop, wherein the deformable component is a piezoelectric or piezoceramic device, wherein a plastic deformation of the piezoelectric or piezoceramic device indicates that the tamper loop has been broken, wherein the plastic deformation causes the piezoelectric or piezoceramic device to become quasi-permanently deformed; and
- providing an integrated circuit (IC) configured and arranged with the tamper loop to detect changes in current indicative of tampering in response to the tamper loop being broken, wherein the IC is further configured and arranged to detect tampering when the tamper loop is subsequently repaired in response to the plastic deformation.

14. The method of claim 13, wherein the tamper detection device is further provided with a sensing circuit configured to sense a change in ohmic resistance resulting from the deformation of the component.

15. The method of claim 14, wherein the sensing circuit is a strain gauge.

16. The method of claim 13, wherein the tamper loop is further configured and arranged to break in response to the quasi-permanent deformation of the deformable component.

* * * * *